… … …

United States Patent [19]

Sugiyama et al.

[11] Patent Number: 4,768,603
[45] Date of Patent: Sep. 6, 1988

[54] REAR WHEEL STEERING APPARATUS FOR VEHICLE

[75] Inventors: Mizuho Sugiyama, Toyota; Yasuo Oguni, Okazaki, both of Japan

[73] Assignee: Toyota Jidosha Kabushiki Kaisha, Japan

[21] Appl. No.: 928,034

[22] Filed: Nov. 7, 1986

[30] Foreign Application Priority Data

Nov. 19, 1985 [JP] Japan .................. 60-259470

[51] Int. Cl.$^4$ .............................................. B62D 6/02
[52] U.S. Cl. ................................... 180/140; 180/142; 280/91
[58] Field of Search ............... 180/140, 234, 236, 141, 180/142, 143, 79.1; 280/91, 99, 707

[56] References Cited

U.S. PATENT DOCUMENTS

| 4,371,191 | 2/1983 | Goldberg et al. ............. 280/707 |
| 4,483,547 | 11/1984 | Furukawa ..................... 280/91 |
| 4,557,493 | 12/1985 | Sano ............................. 280/91 |

FOREIGN PATENT DOCUMENTS

| 96372 | 12/1983 | European Pat. Off. ............ 280/91 |
| 3300640 | 7/1984 | Fed. Rep. of Germany . |
| 192773 | 6/1982 | Japan . |
| 214469 | 12/1983 | Japan ............................ 180/140 |
| 59-23716 | 2/1984 | Japan . |
| 227565 | 12/1984 | Japan ............................ 280/91 |
| 60-15051 | 2/1985 | Japan . |
| 60-138815 | 9/1985 | Japan . |
| 60-193780 | 10/1985 | Japan . |
| 2155869 | 10/1985 | United Kingdom . |

OTHER PUBLICATIONS

Japanese Patent Application 58-214469, Laid Open on Dec. 13, 1983, Inventor: Shibahata et al.
Japanese Patent Application 59-227565, Laid Open on Dec. 20, 1984, Inventor: Kanazawa et al.
Japanese Patent Application 58-192773, Laid Open on Dec. 21, 1983, Inventor: Tani et al.

Primary Examiner—John J. Love
Assistant Examiner—Everett G. Diederiks, Jr.
Attorney, Agent, or Firm—Parkhurst & Oliff

[57] ABSTRACT

A rear wheel steering apparatus for a vehicle has a vehicle speed sensor for detecting a vehicle speed, a front wheel steer angle sensor for detecting a steer angle of front wheels of the vehicle, a rear wheel steer angle driving device for varying the steer angle of each of the right and left rear wheels, and a rear wheel steer angle controller for controlling the rear wheel steer angle driving device. The controller is adapted to calculate a toe-in quantity of the rear wheels as an increasing function of the vehicle speed, calculate a steer angle of each of the right and left rear wheels by the use of the vehicle speed and the steer angle of the front wheels, and control the rear wheel steer angle driving device on the basis of results of these calculating operations such that the steer angle of each of the right and left rear wheels changes by a predetermined angle. Accordingly, it is possible to improve the response to the steering input for turning the vehicle.

19 Claims, 5 Drawing Sheets

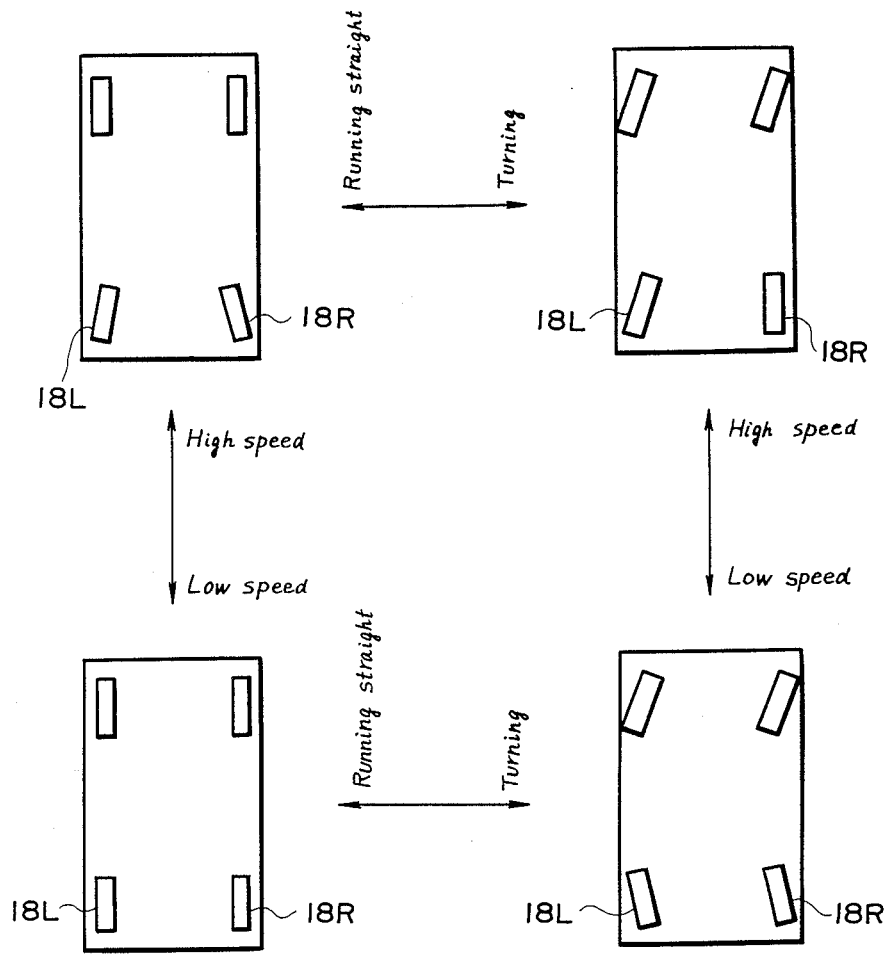

In the case where toe-in quantity is zero

In the case of embodiment of the invention

REAR WHEEL STEERING APPARATUS FOR VEHICLE

BACKGROUND OF THE INVENTION

1. Field of the Invention

The present invention relates to a rear wheel steering apparatus designed to control the steer angle of each of the right and left rear wheels of a vehicle on the basis of the turning condition of the vehicle, that is, in accordance with both the vehicle speed and the steer angle of front wheels of the vehicle.

2. Description of the Related Art

One type of rear wheel steering apparatus has already been proposed in which the steer angle of each of the right and left rear wheels is controlled by means of a hydraulic mechanism (see, e.g., Japanese Utility Model Laid-Open No. 192773/1983 and Japanese Patent Laid-Open No. 214470/1983). The arrangement of this prior art enables an appropriate cornering force to be generated during turning of the vehicle, thus allowing steering stability to be improved.

However, the rear wheel steering apparatus of the type described above suffers from the problem that the rise of cornering force is disadvantageously slow due to, for example, an unavoidable response lag in an electrical or mechanical control system, which involves unsatisfactory response to a change in the angle of steering rotation of the steering wheel, particularly when the vehicle is made to turn while running at high speed.

SUMMARY OF THE INVENTION

In view of the above circumstances, it is primary object of the present invention to provide a rear wheel steering apparatus of a vehicle for individually steering rear wheels on the basis of the turning condition of the vehicle. Turning ability of the vehicle is improved in response to change of the steer angle of a steering wheel.

To this end, the present invention provides a rear wheel steering apparatus of the vehicle to seek the rear wheel steering angle on the basis of the turning condition of the vehicle, comprising: a vehicle speed sensor for detecting a vehicle speed; a front wheel steer angle sensor for detecting a steer angle of front wheels of the vehicle; rear wheel steer angle driving means for varying the steer angle of each of the right and left rear wheels; and rear wheel steer angle control means adapted to calculate a toe-in quantity of the rear wheels (a value representing the angular orientation of the rear wheel with respect to each other) as an increasing function of the vehicle speed, calculate a steer angle of each of the right and left rear wheels by the use of the vehicle speed and the steer angle of the front wheels, and control the rear wheel steer angle driving means on the basis of results of these calculating operations such that the steer angle of each of the right and left rear wheels changes by a predetermined angle.

When a vehicle is running straight, the tow-in quantity increases in proportion to the vehicle speed. Accordingly, the running stability is improved.

When the front wheels of the vehicle are steered while the vehicle is running straight at high speed, the right and left rear wheels are steered in accordance with a vehicle speed and a steer angle of the front wheels. At this time, if the rear wheels are steered in the same direction as the ront wheels, since the rear wheels are given a toe-in quantity corresponding to the vehicle speed in advance, the cornering force which acts on the inner rear wheel suddenly changes from a negative value (at which the cornering force acts away from the center of turning of the vehicle) corresponding to the toe-in quantity to zero, and gradually increases thereafter, whereas the cornering force which acts on the outer rear wheel increases gradually from a positive (toward the center of turning value corresponding to the toe-in quantity. In consequence, the sum of the cornering forces which act on the right and left rear wheels, respectively, rises steeply.

Thus, when the vehicle is made to turn, a cornering force (the higher the vehicle speed, the larger the cornering force) has already been acting on the outer wheel toward the center of turning of the vehicle, and the cornering force which acts on the inner wheel away from the center of turning disappears quickly (the higher the vehicle speed, the more quickly the cornering force disappears). Accordingly, the cornering force which acts on the whole of the rear wheels rises sharply to improve the response to a change in the angle of rotation of the steering wheel for turning the vehicle.

BRIEF DESCRIPTION OF THE DRAWINGS

FIG. 4 shows the operation of the embodiment; and

DESCRIPTION OF THE PREFERRED EMBODIMENT

One embodiment of the rear wheel steering apparatus according to the present invention will be described hereinunder with reference to the accompanying drawings.

Figure 1:
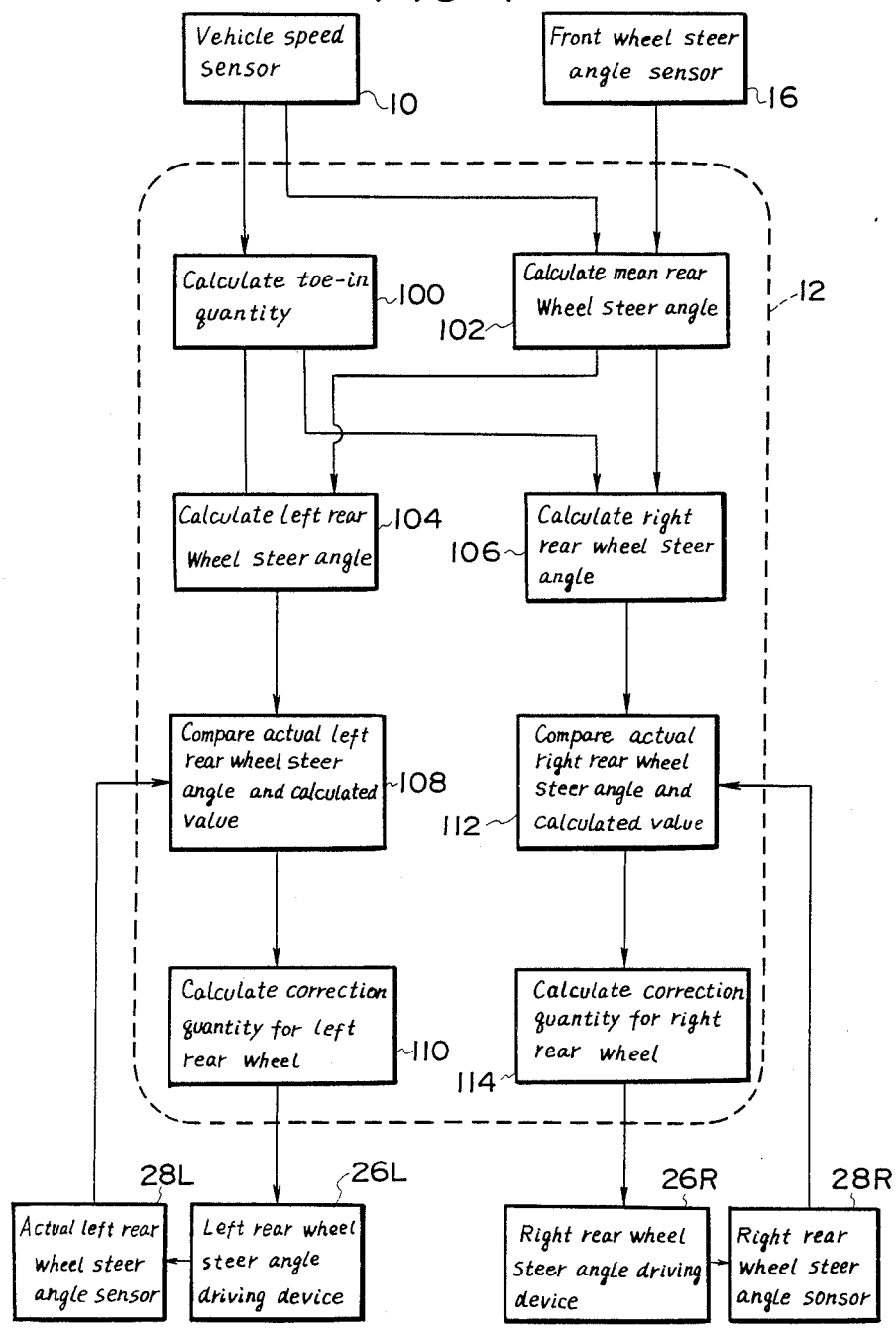
FIG. 1 is a functional block diagram of one embodiment of the rear wheel steering apparatus according to the present invention.
Figure 2:
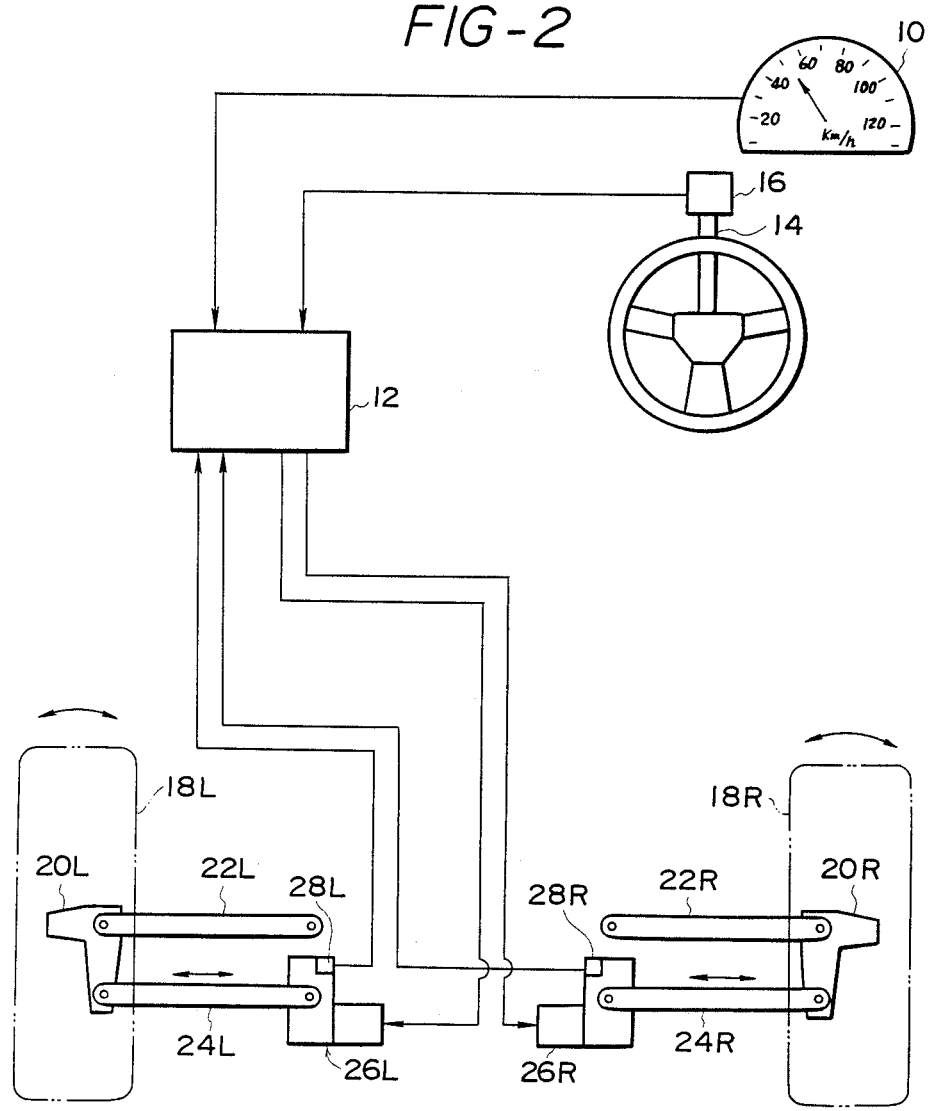
FIG. 2 schematically shows the arrangement of the embodiment.

FIG. 2 schematically shows the arrangement of one embodiment of the present invention. This embodiment will be explained below with reference to the functional block diagram shown in FIG. 1.

A vehicle speed which is detected by a vehicle speed sensor 10 is supplied to a microcomputer 12, and a toe-in quantity is calculated in a block 100. The toe-in quantity, a value representing the angular orientation of the rear wheels with respect to each other, may be calculated according to the following formula:

$$T = k_1 \{a + \tan^{-1}(bv + c)\} \tag{1}$$

In the formula (1), v represents a vehicle speed, and $k_1$, a, b and c are constants. According to the formula (1), T is an increasing function of v. It should be noted that, when $v = 0$, $T = 0$.

An angle of rotation of a steering column shaft 14 (a front wheel steer angle $\theta f$) is detected by a front wheel steer angle sensor 16 and supplied to the microcomputer 12. The front wheel steer angle sensor 16 is constituted by, for example, a rotary encoder or a potentiometer. In a block 102, the microcomputer 12 obtains a mean steer angle of the left rear wheel 18L and the right rear wheel 18R, i.e., a mean rear wheel steer angle θr, by the use of the detected front wheel steer angle θf and the detected vehicle speed v and in accordance with the following formula:

$$\theta r = k_2 \frac{v^2 - \alpha}{v^2 - \beta} \theta f \quad (2)$$

In the formula (2), $k_2$, $\alpha$ and $\beta$ are constants. According to the formula (2), θr is proportional to θf and is an increasing function of v. When v=0, the signs of θr and θf are opposite to each other, and when $v^2 = \alpha$, θr is 0 regardless of the value of θf.

Then, the microcomputer 12 calculates a left rear wheel steer angle θrl and a right rear wheel steer angle θrr, which are target values, in accordance with the following formulae in blocks 104 and 106, respectively:

$$\theta rl = \theta r + \tan^{-1}(T/2L) \quad (3)$$

$$\theta rr = \theta r - \tan^{-1}(T/2L) \quad (4)$$

In the above formulae, L represents the diameter of the rear wheels.

As shown in FIG. 2, a wheel supporting member 20L is rigidly secured to the left rear wheel 18L. One end of a first arm 22L is connected to the axial portion of the wheel supporting member 20L, and one end of a second arm 24L is connected to a portion of the member 20L which is remote from the axial portion thereof. The other end of the second arm 24L is connected to a left rear wheel steer angle driving device 26L, so that the second arm 24L is activated by the driving device 26L to move horizontally as viewed in FIG. 2, thus enabling the left rear wheel 18L to be pivoted. The left rear wheel steer angle driving device 26L is provided with a left rear wheel steer angle sensor 28L to detect a steer angle of the left rear wheel 18L, the detected steer angle being supplied to the microcomputer 12.

The microcomputer 12 makes, in a block 108, comparison between the calculated left rear wheel steer angle θrl and an actual steer angle which is detected by the left rear wheel steer angle sensor 28L, and calculates, in a block 110, a left rear wheel steer angle correction quantity which is proportional to the difference between the calculated steer angle and the detected actual steer angle. The microcomputer 12 then supplies a driving signal corresponding to the calculated correction quantity to the left rear wheel steer angle driving device 26L. In consequence, the second arm 24L is moved either leftward or rightward as viewed in FIG. 2, causing the left rear wheel 18L to pivot so that the actual steer angle of the left rear wheel 18L approaches the target value.

The arrangement of the right rear wheel 18R and its associated elements is similar to that of the left rear wheel 18L and its associated elements. Therefore, the same portions or members as those on the left rear wheel side are denoted by the same reference numerals, and R is suffixed thereto in place of L. Further, in FIG. 1, the block 112 corresponds to the block 108, and the block 114 corresponds to the block 110.

Figure 3A:
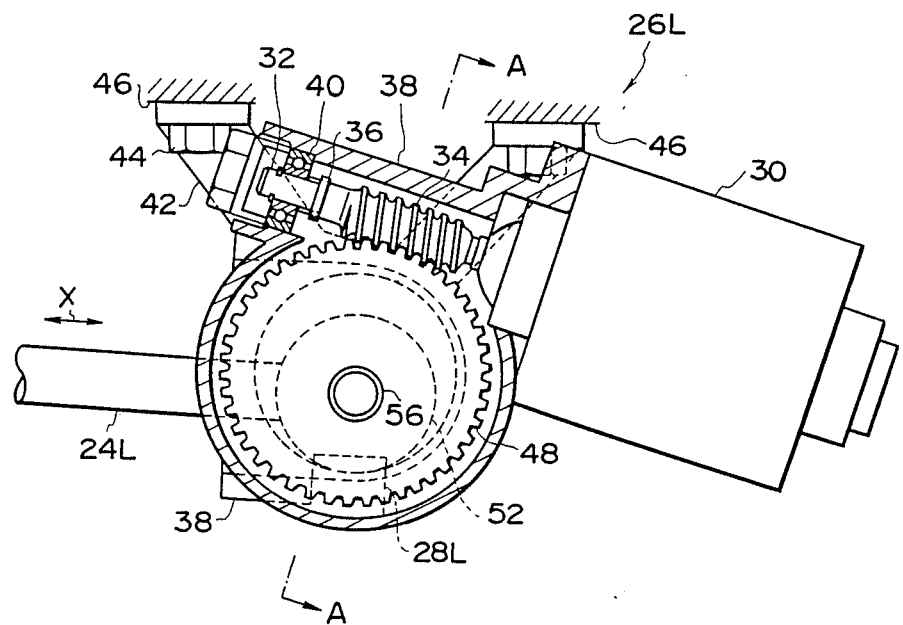
FIG. 3(A) is a partly-sectioned front view of a left rear wheel steer angle driving device.
Figure 3B:
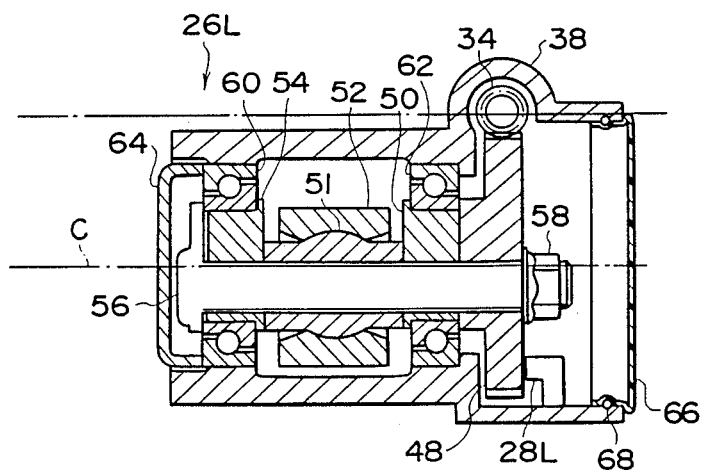
FIG. 3(B) is a sectional view taken along the line A—A of FIG. 3(A)

The details of the left rear wheel steer angle driving device 26L will be explained below with reference to FIG. 3.

A worm 34 is fitted on a rotating shaft 32 of a motor 30 and rigidly secured to the shaft 32 by a pin 36. The distal end portion of the rotating shaft 32 is rotatably supported by a radial bearing 40 which is rigidly secured to a housing 38. The housing 38 is rigidly secured to a vehicle body 46 through a bracket 42 by means of bolts 44. The worm 34 is meshed with a worm wheel 48. The worm wheel 48 is provided with an eccentric cam 50, a pillow ball inner tube 51 and an eccentric cam 54, which are adjacently disposed side by side in conjunction with the worm wheel 48. A shaft 56 is passed through the worm wheel 48, the cam 50, the inner tube 51 and the cam 54, and these members are fastened together by means of a nut 58. The shaft 56 is eccentric with respect to the mutual center C of the worm wheel 48 and the eccentric cams 50 and 56. A pillow ball outer tube 52 is fitted on the pillow ball inner tube 51, and the second arm 24L is welded to the peripheral surface of the pillow ball outer tube 52. The eccentric cam 54 is rotatably supported by an angular contact ball bearing 60, and the eccentric cam 50 is rotatably supported by an angular contact ball bearing 62. A bearing adjust nut 64 is in thread engagement with an opening provided at one end of the housing 38, and a cap 66 is fitted into an opening at the other end of the housing 38. An O-ring 68 is provided on the inner peripheral surface of the housing 38 so as to face the peripheral surface of the cap 66.

Accordingly, when the motor 30 is turned on to rotate the worm 34, the worm wheel 48, the eccentric cam 50, the pillow ball inner tube 51 and the eccentric cam 54 rotate together in one unit around the mutual central axis C. In consequence, the second arm 24L is moved in the directions of the arrow X. The distal end portion of the second arm 24L is also movable vertically about the pillow ball inner tube 51, thereby allowing roll steer characteristics to be variable.

The amount of movement of the second arm 24L is detected by a rear wheel steer angle detecting means. In this embodiment, the amount of movement of the second arm 24L is detected by the left rear wheel steer angle sensor 28L which is rigidly secured to the housing 38 in such a manner as to face the end face of the worm wheel 48. For example, the left rear wheel steer angle sensor 28L is constituted by a combination of a light-emitting element and a light-receiving element, and a sheet of reflecting paper which is provided with reflecting regions at predetermined regular spacings is stuck to the end face of the worm wheel 48. In another example, magnets are buried in the end face of the worm wheel 48 at predetermined regular spacings, and a change in impedance is detected by the left rear wheel steer angle sensor 28L to detect an angle of rotation of the worm wheel 48, thereby detecting an amount of movement of the second arm 24L in the directions of the arrow X.

The arrangement of the right rear wheel steer angle driving device 26R from the right rear wheel 18R is the same as that of the above-described arrangement of the left rear wheel steer angle driving device 26L for the left rear wheel 18L.

The operation of this embodiment, arranged as detailed above, will be explained below with reference to FIG. 4.

When the vehicle is running straight as low speed, the front wheel steer angle θf is 0, and the mean value of the rear wheel steer angle θr is 0 from the formula (2). Since the value of v is relatively small, the toe-in quantity T is substantially 0 from the formula (1). Accordingly, both the left rear wheel steer angle θrl and the right rear wheel steer angle $\theta rr$ are substantially 0 from the formula (3) and (4).

When the vehicle is running straight at high speed, $\theta_f=0$, and therefore $\theta r=0$ is found from the formula (2). It will be clear from the formula (1) that, as the value of v increases, the toe-in quantity T increases. Accordingly, the condition of $\theta rl = -\theta rr$ holds from the formulae (3) and (4). As the vehicle speed increases, the toe-in quantity increases, and therefore it is possible to obtain straight running stability in correspondence with the vehicle speed.

When the vehicle turns right while running at low speed, the toe-in quantity T is substantially 0 from the formula (1). The means rear wheel steer angle $\theta r$ is substantially proportional to the front wheel steer angle $\theta f$ from the formula (2), the signs of $\theta r$ and $\theta f$ being opposite to each other. Accordingly, the condition of $\theta rl=\theta rr$ holds from the formulae (3) and (4). The values of $\theta rl$ and $\theta rr$ at this time are proportional to the front wheel steer angle $\theta f$ and opposite in sign to $\theta f$ from the formulae (3) and (4). In consequence, the center of turning of the front wheels and that of the rear wheels are coincident with each other, so that the slip angle is decreased and the running stability is therefore improved.

When the vehicle turns while running at high speed, the value of the toe-in quantity T increases as the value of v increases from the formula (1). The front wheel steer angle $\theta r$ is substantially proportional to the mean rear wheel steer angle $\theta f$ and the signs of these values are coincident with each other.

Figure 5A:
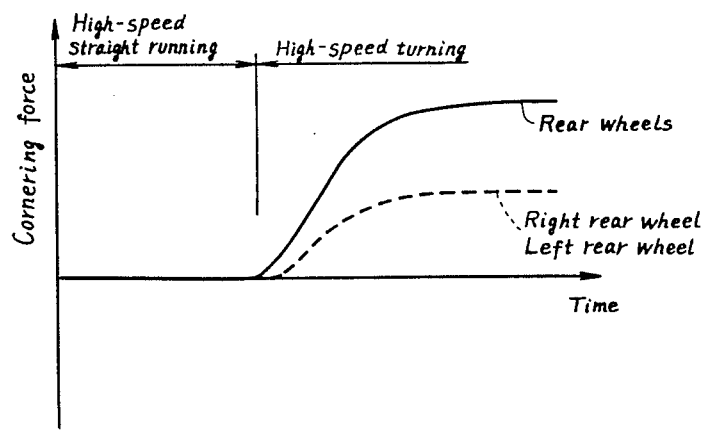
FIGS. 5(A) and 5(B) are graphs employed to explain advantages offered by the embodiment of the present invention.
Figure 5B:
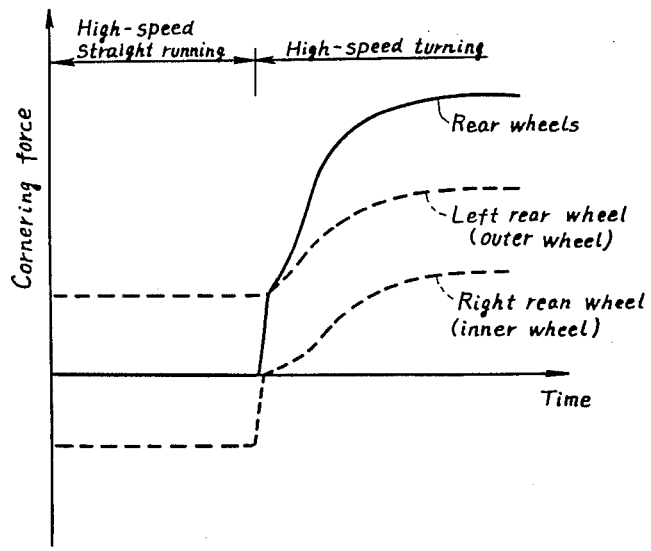

When the vehicle turns right at high speed after running straight at high speed, this embodiment offers the advantage as described below. FIG. 5(A) shows a case where the toe-in quantity T does not following the formula (1), i.e., T=0. In such case, at the beginning of the high-speed turning, the cornering forces which act on the right and left rear wheels, respectively, increase gradually from zero, and the cornering force which acts on the whole of the rear wheels gradually increases with the passage of time. Accordingly, the response to a change in the angle of rotation of the steering wheel for turning the vehicle is unsatisfactory.

In contrast to the above, according to this embodiment, the cornering force acting on the right rear wheel (the inner wheel) changes from a negative (away from the center of turning of the vehicle) value corresponding to a particular toe-in quantity to a positive (toward the center of turning) value. In this case, the cornering force which acts away from the center of turning quickly disappears. On the other hand, the cornering force which acts on the left rear wheel (the outer wheel) toward the center of turning increases so as to become larger than a positive value corresponding to the toe-in quantity. Accordingly, the cornering force which acts on the whole of the rear wheels also suddenly changes, so that the response to a change in the angle of rotation of the steering wheel for turning the vehicle is improved.

It should be noted that the rear wheel steer angle detecting means may be arranged such as to detect an amount of vertical movement of the second arm to correct a steer angle detected by each of the rear wheel steer angle sensors 28L and 28R, thereby calculating an actual rear wheel steer angle even more accurately. It is a matter of course that the formulae (1) to (4) for calculating rear wheel steer angles are not necessarily limitative thereto.

In the rear wheel steering apparatus according to the present invention the rear wheel steer angle is sought from the turning condition of the vehicle. In other words, a toe-in quantity which is an increasing function of the vehicle speed is calculated by the use of a vehicle speed, while steer angles of the right and left rear wheels are calculated by the use of a vehicle speed and a front wheel steer angle, and the rear wheel steer angle driving means is controlled on the basis of results of these calculating operations such that the steer angle of each of the right and left rear wheels changes by a predetermined angle. Therefore, when the vehicle is running straight, it is possible to obtain an appropriate toe-in quantity in correspondence with the vehicle speed, so that the running stability is improved. At the beginning of a high-speed turning operation, a cornering force (the higher the vehicle speed, the larger the cornering force) toward the center of turning of the vehicle has already been acting on the outer rear wheel when the vehicle makes a turn, and the cornering force away from the center of turning which acts on the inner rear wheel disappears quickly (the higher the vehicle speed, the more quickly the cornering force disappears). Therefore, the cornering force which acts on the whole of the rear wheels rises sharply, and the response to a change in the angle of rotation of the steering wheel for turning the vehicle is improved, advantageously.

Although the present invention has been described through specific terms, it should be noted here that the described embodiment is not necessarily limitative and various changes and modifications may be imparted thereto without departing from the scope of the invention which is limited solely by the appended claims.

We claim:

1. A rear wheel steering apparatus for a vehicle, comprising:
   a vehicle speed sensor for detecting a vehicle speed;
   means for detecting a turning condition of the vehicle;
   rear wheel steering angle driving means for varying the steer angle of each of the right and left rear wheels; and
   rear wheel steering angle control means for calculating a toe-in quantity, representing the angular orientation of said rear wheels with respect to each other, as an increasing function of the vehicle, speed; calculating a reference rear wheel steering angle on the basis of the turning condition of the vehicle, calculating a steer angle of each of said right and left rear wheels on the basis of said toe-in quantity and said reference rear wheel steer angle, and controlling said rear wheel steer angle driving means on the basis of the calculated steer angle of each of said right and left rear wheels such that the steer angle of each of said right and left rear wheels and the toe-in quantity of said rear wheels changes by predetermined angles.

2. A rear wheel steering apparatus according to claim 1, further comprising a right rear wheel steer angle sensor for detecting an actual steer angle of said right rear wheel, and a left rear wheel steer angle sensor for detecting an actual steer angle of said left rear wheel.

3. A rear wheel steering apparatus according to claim 2, wherein said rear wheel steer angle driving means includes right rear wheel steer angle driving means and left rear wheel steer angle driving means.

4. A rear wheel steering apparatus according to claim 3, further comprising a front wheel steer angle sensor for detecting a steer angle of front wheels of said vehicle and wherein said reference rear wheel steering angle is a mean rear wheel steer angle calculated by the use of the vehicle speed and the steer angle of said front wheels.

5. A rear wheel steering apparatus according to claim 4, wherein said control means includes target right rear wheel steer angle calculating means and target left rear wheel steer angle calculating means for calculating a target right rear wheel steer angle and a target left rear wheel steer angle, respectively, on the basis of said calculated toe-in quantity and said calculated mean rear wheel steer angle.

6. A rear wheel steering apparatus according to claim 5, wherein said control means includes right rear wheel steer angle comparing means for making comparison between an actual steer angle of said right rear wheel detected by said right rear wheel steer angle sensor and a target right rear wheel steer angle calculated by said target right rear wheel steer angle calculating means, and left rear wheel steer angle comparing means for making comparison between an actual steer angle of said left rear wheel detected by said left rear wheel steer angle sensor and a target left rear wheel steer angle calculated by said target left rear wheel steer angle calculating means.

7. A rear wheel steering apparatus according to claim 6, wherein said control means includes right rear wheel steer angle correcting means adapted to calculate a correction quantity for a steer angle of said right rear wheel on the basis of a signal output from said right rear wheel steer angle comparing means and control said right rear wheel steer angle driving means on the basis of the calculated correction quantity, and left rear wheel steer angle correcting means adapted to calculate a correction quantity for a steer angle of said left rear wheel on the basis of a signal output from said left rear wheel steer angle comparing means and control said left rear wheel steer angle driving means on the basis of the calculated correction quantity.

8. A rear wheel steering apparatus according to claim 7, wherein each of said right and left rear wheel steer angle driving means has an arm for giving a steer angle to the corresponding rear wheel, and a motor for activating said arm.

9. A rear wheel steering apparatus according to claim 8, wherein each of said right and left rear wheel steer angle driving means further has a pillow ball inner tube and a pillow ball outer tube which are disposed between said arm and said motor, said pillow ball inner tube being eccentrically rotated by said motor, and said pillow ball outer tube being fitted on said pillow ball inner tube and rigidly secured to one end of said arm.

10. A rear wheel steering apparatus according to claim 1, wherein said turning condition of the vehicle is sought from the vehicle speed and the steer angle of the front wheels.

11. A rear wheel steering apparatus for a vehicle, comprising:
a vehicle speed sensor for detecting a vehicle speed;
means for detecting a turning condition of the vehicle;
right rear wheel steer angle driving means for varying the steer angle of a right rear wheel of said vehicle and left rear wheel steer angle driving means for varying the steer angle of a left rear wheel of said vehicle; and rear wheel steering angle control means for calculating a toe-in quantity, representing the angular orientation of said rear wheel with respect to each other, as an increasing function of the vehicle speed; controlling said right and left rear wheel steer angle driving means such that the calculated toe-in quantity is given to said right and left rear wheel; calculating, when said vehicle makes a turn, a reference rear wheel steering angle based upon the turning condition of the vehicle, calculating steer angles of said right and left rear wheels based on the calculated toe-in quantity and the calculated reference rear wheel steering angle; and controlling said right and left rear wheel steer angle driving means on the basis of the calculated steer angles of each of said right and left rear wheels such that the steer angle of each of said right and left rear wheels and the toe-in quantity of said rear wheels changes by predetermined angles.

12. A rear wheel steering apparatus according to claim 11, further comprising a right rear wheel steer angle sensor for detecting an actual steer angle of said right rear wheel, and a left rear wheel steer angle sensor for detecting an actual steer angle of said left rear wheel.

13. A rear wheel steering apparatus according to claim 12, further comprising a front wheel steer angle sensor for detecting a steer angle of front wheels of said vehicle and wherein said reference rear wheel steering angle is a mean rear wheel steering angle calculated by the use of the vehicle speed and the steer angle of said front wheels.

14. A rear wheel steering apparatus according to claim 13, wherein said control means includes target right rear wheel steer angle calculating means and target left rear wheel steer angle calculating means for calculating a target right rear wheel steer angle and a target left rear wheel steer angle, respectively, on the basis of said calculated toe-in quantity and said calculated mean rear wheel steer angle.

15. A rear wheel steering apparatus according to claim 14, wherein said control means includes right rear wheel steer angle comparing means for making comparison between an actual steer angle of said right rear wheel detected by said right rear wheel steer angle sensor and a target right rear wheel steer angle calculated by said target right rear wheel steer angle calculating means, and left rear wheel steer angle comparing means for making comparison between an actual steer angle of said left rear wheel detected by said left rear wheel steer angle sensor and a target left rear wheel steer angle calculated by said target left rear wheel steer angle calculating means.

16. A rear wheel steering apparatus according to claim 15, wherein said control means includes right rear wheel steer angle correcting means adapted to calculate a correction quantity for a steer angle of said right rear wheel on the basis of a signal output from said right rear wheel steer angle comparing means and control said right rear wheel steer angle driving means on the basis of the calculated correction quantity, and left rear wheel steer angle correcting means adapted to calculate a correction quantity for a steer angle of said left rear wheel on the basis of a signal output from said left rear wheel steer angle comparing means and control said left rear wheel steer angle driving means on the basis of the calculated correction quantity.

17. A rear wheel steering apparatus according to claim 16, wherein each of said right and left rear wheel steer angle driving means has an arm for giving a steer angle to the corresponding rear wheel, and a motor for activating said arm.

18. A rear wheel steering apparatus according to claim 17, wherein each of said right and left rear wheel steer angle driving means further has a pillow ball inner tube and a pillow ball outer tube which are disposed between said arm and said motor, said pillow ball inner tube being eccentrically rotated by said motor, and said pillow ball outer tube being fitted on said pillow ball inner tube and rigidly securing to one end of said arm.

19. A rear wheel steering apparatus according to claim 11, wherein said turning condition of the vehicle is sought from the vehicle speed and the steer angle of the front wheels.

* * * * *